(12) United States Patent
Yamaji

(10) Patent No.: US 9,785,826 B2
(45) Date of Patent: Oct. 10, 2017

(54) IMAGE PROCESSOR, IMPORTANT PERSON DETERMINATION METHOD, IMAGE LAYOUT METHOD AS WELL AS PROGRAM AND RECORDING MEDIUM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 76 days.

(21) Appl. No.: 14/633,192

(22) Filed: Feb. 27, 2015

(65) Prior Publication Data

US 2015/0261994 A1 Sep. 17, 2015

(30) Foreign Application Priority Data

Mar. 11, 2014 (JP) ................. 2014-047574

(51) Int. Cl.
*G06K 9/00* (2006.01)
*H04N 1/00* (2006.01)

(52) U.S. Cl.
CPC ..... *G06K 9/00228* (2013.01); *G06K 9/00288* (2013.01); *H04N 1/00196* (2013.01)

(58) Field of Classification Search
None
See application file for complete search history.

(56) References Cited

U.S. PATENT DOCUMENTS

| 9,014,487 | B2 | 4/2015 | Kato et al. |
| 2006/0221779 | A1* | 10/2006 | Matsushita ......... G06F 17/3028 369/30.01 |
| 2009/0292549 | A1 | 11/2009 | Ma et al. |
| 2012/0002881 | A1 | 1/2012 | Maeda |
| 2013/0182963 | A1 | 7/2013 | Cok |
| 2014/0010463 | A1 | 1/2014 | Kato et al. |

FOREIGN PATENT DOCUMENTS

| JP | 2006-79457 | 3/2006 |
| JP | 2006-244279 A | 9/2006 |
| JP | 2006-259932 | 9/2006 |
| JP | 2006-314010 | 11/2006 |
| JP | 2006-318034 | 11/2006 |
| JP | 2007-049387 A | 2/2007 |

(Continued)

OTHER PUBLICATIONS

European Search Report dated Oct. 21, 2015 in corresponding European Patent Application No. 15155503.4.

(Continued)

*Primary Examiner* — Mark Roz
(74) *Attorney, Agent, or Firm* — Young & Thompson

(57) ABSTRACT

An image processor is provided which is configured to detect face images from a plurality of image data, to perform same person determination processing based on the detected face images to classify the face images into image groups each including face images of a single person, thereby identifying persons corresponding to the respective image groups, to determine at least one person as a main person from among the identified persons, and to determine at least one person highly related to the main person as an important person from among persons except the main person.

20 Claims, 10 Drawing Sheets

(56) References Cited

FOREIGN PATENT DOCUMENTS

JP      2009-223764     10/2009
JP       2014-16785      1/2014

OTHER PUBLICATIONS

JP Office Action, dated Feb. 2, 2016; Application No. 2014-047574.
European Search Report dated Feb. 27, 2017 in corresponding European Patent Application No. 15155503.4.
Japanese Office Action dated May 9, 2017 in corresponding Japanese Patent Application No. 2016-068871 with JPO machine translation of Japanese Office Action.

* cited by examiner b.jpg c.jpg e.jpg k.jpg

FIG.11

| PATTERN | PATTERN | | TRIMMING METHOD | TRIMMING IMAGE |
|---|---|---|---|---|
| | ① INCLUDING MAIN PERSON AND IMPORTANT PERSON | ② OTHER PERSONS ARE SHOT NEAR MAIN PERSON AND IMPORTANT PERSON | | |
| 1 | ○ | × | TRIMMING IS PERFORMED SO THAT MAIN PERSON AND IMPORTANT PERSON ARE CENTERED | |
| 2 | ○ | ○ | TRIMMING IS PERFORMED SO AS TO ALSO INCLUDE OTHER PERSONS IN ADDITION TO MAIN PERSON AND IMPORTANT PERSON | |
| 3 | × | — | TRIMMING IS PERFORMED SO AS TO INCLUDE ALL PERSONS | |

1

IMAGE PROCESSOR, IMPORTANT PERSON DETERMINATION METHOD, IMAGE LAYOUT METHOD AS WELL AS PROGRAM AND RECORDING MEDIUM

CROSS-REFERENCE TO RELATED APPLICATIONS

The present application claims priority under 35 U.S.C. §119 to Japanese Patent Application No. 2014-047574, filed on Mar. 11, 2014. Each of the above application is hereby expressly incorporated by reference, in its entirety, into the present application.

BACKGROUND OF THE INVENTION

The present invention relates to an image processor, an important person determination method and an image layout method for determining an important person from among persons on images based on a plurality of image data and performing an image layout as well as a program and a recording medium for causing a computer to execute each procedure of the important person determination method or the image layout method.

An image product such as a photo book has heretofore been automatically created based on a plurality of image data stored in a storage of a cellular phone or a personal computer or in a flash memory of a digital camera or the like (see, for example, JP 2007-49387 A).

In general, automatic creation of an image product is convenient because a user does not have to select image data to be put on the image product from among a large quantity of image data and lay out the selected image data one by one.

Nevertheless, an image product that can be created does not necessarily provide a high level of satisfaction to the user. For example, as shown in FIG. 13, in automatic creation of an image product, images of a child of someone else may be mainly laid out in spite of the desire that images of his or her own child be mainly laid out, which may reduce user satisfaction with the automatically created image product.

JP 2007-49387 A proposes an image output device which detects face images from individual image data, calculates the degree of dominance of the face images as subjects, calculates the degree of importance of image data based on the degree of dominance and lays out based on the degree of importance.

In addition, JP 2006-244279 A discloses an invention of an image classifier which detects face images of persons from frame images of a motion picture and compares all the face images to classify the compared face images into face image groups corresponding to the respective persons, thereby presuming a person having the highest appearance frequency to be a main person.

SUMMARY OF THE INVENTION

It may be possible to avoid the layout as shown in FIG. 13 by making use of the image output device in JP 2007-49387 A or the technique of the image classifier in JP 2006-244279 A. However, the degree of dominance of a face image as a subject in JP 2007-49387 A or a main person to be presumed in JP 2006-244279 A is determined according to the number of appearances (appearance frequency, number of detections) of the face image, in other words, the number of appearances of a person corresponding to the face image and it has been difficult in the image output device of JP 2007-49387 A and the image classifier of JP 2006-244279 A to extract image data including an important person which appears less frequently.

For example in a case where a family photo book mainly including a child (as a main person) is to be created, his or her father and grandparents are important persons but the father is often a photographer and tends to appear less frequently than his or her mother. What is more, for example, the grandparents and other persons which do not live with the child are also considered to appear less frequently. Accordingly, creation of such a photo book making use of the image output device in JP 2007-49387 A or the image classifier in JP 2006-244279 A gave rise to a problem of creation of a photo book which did not include a father or grandparents who appeared less frequently.

The present invention aims at solving the above-described prior art problems and providing an image processor, an important person determination method and an image layout method for determining an important person and performing an image layout irrespective of the number of appearances as well as a program and a recording medium for causing a computer to execute each procedure of the important person determination method or the image layout method.

In order to solve the above-described problems, the present invention provides an image processor comprising: an image data acquirer configured to acquire a plurality of image data; a face image detector configured to detect face images from the plurality of image data acquired by the image data acquirer; a person identifier configured to perform same person determination processing based on the face images detected in the face image detector to classify the face images into image groups each including face images of a single person, thereby identifying persons corresponding to the respective image groups; a main person determiner configured to determine at least one person as a main person from among the persons identified by the person identifier; and an important person determiner configured to determine at least one person highly related to the main person as an important person based on the main person determined in the main person determiner, from among persons except the main person as identified by the person identifier.

Preferably, the main person determiner determines, as the main person, a person whose number of detected face images is largest.

Preferably, the important person determiner determines a person who is seen with the main person on a largest number of image data as the important person, from among persons except the main person as identified by the person identifier.

Preferably, the face image detector detects the face images and positional information of the face images from the plurality of image data, and the important person determiner calculates a distance between two face images based on positional information of the main person and positional information of a person other than the main person on a single image as detected in the face image detector and determines whether the person is the important person based on the distance between the two face images.

Preferably, each of the plurality of image data includes, as meta-information, at least one of shooting date and time information and shooting position information, and the important person determiner determines whether a person other than the main person is the important person based on at least one of a difference between shooting date and time information of image data including the main person and shooting date and time information of image data including the person other than the main person and a difference between shooting position information of the image data including the main person and shooting position information of the image data including the person other than the main person.

Preferably, the image processor further comprises: a storage configured to store the plurality of image data; an image data manager configured to classify the plurality of image data stored in the storage to manage the plurality of image data as predetermined management image groups; and a monitor configured to display management images representing the predetermined management image groups, respectively, the image data manager highlights the management images displayed on the monitor when image data including at least one of the main person and the important person exists in the predetermined management image groups.

Preferably, the image processor further comprises: a priority setter configured to set priorities of the plurality of image data based on the main person determined in the main person determiner and the important person determined in the important person determiner, an image layout determiner configured to determine a layout of the plurality of image data based on the priorities set in the priority setter, and an output portion configured to output the plurality of image data in the layout determined by the image layout determiner.

Preferably, the priority setter sets the priorities based on at least one of presence or absence of the main person and the important person, arrangement of the main person and the important person, and positional relations of the main person and the important person with other persons.

Preferably, the image processor further comprises a person changer configured to change the main person or the important person based on a user's instruction, the priority setter changes the priorities based on a main person or an important person after change in the person changer, and the image layout determiner changes the layout of the plurality of image data based on priorities after change.

Preferably, the image processor further comprises an image trimmer configured to subject images based on the plurality of image data to trimming processing according to the layout, and the image trimmer performs the trimming processing based on at least one of presence or absence of the main person and the important person, arrangement of the main person and the important person, and positional relations of the main person and the important person with other persons.

The present invention also provides an important person determination method comprising: detecting face images from a plurality of image data; performing same person determination processing based on the detected face images to classify the face images into image groups each including face images of a single person, thereby identifying persons corresponding to the respective image groups; determining at least one person as a main person from among the identified persons; and determining at least one person highly related to the main person as an important person based on the determined main person, from among persons except the main person.

Preferably, a person whose number of detected face images is largest is determined as the main person.

Preferably, a person who is seen with the main person on a largest number of image data is determined as the important person, from among persons except the main person.

Preferably, the face images and positional information of the face images are detected from the plurality of image data, and a distance between two face images is calculated based on positional information of the main person and positional information of a person other than the main person on a single image and whether the person is the important person is determined based on the distance between the two face images.

Preferably, each of the plurality of image data includes, as meta-information, at least one of shooting date and time information and shooting position information, and whether a person other than the main person is the important person is determined based on at least one of a difference between shooting date and time information of image data including the main person and shooting date and time information of image data including the person other than the main person and a difference between shooting position information of the image data including the main person and shooting position information of the image data including the person other than the main person.

The present invention also provides an image layout method comprising: determining priorities of the plurality of image data based on the main person and the important person determined based on the above-described important person determination method, and determining a layout of the plurality of image data based on the priorities.

Preferably, the priorities are determined based on at least one of presence or absence of the main person and the important person, arrangement of the main person and the important person, and positional relations of the main person and the important person with other persons.

Preferably, when the main person or the important person was changed based on a user's instruction, the priorities are changed based on a main person or important person after change, and the layout of the plurality of image data is changed based on priorities after change.

Preferably, images based on the plurality of image data are subjected to trimming processing based on the layout and at least one of presence or absence of the main person and the important person, arrangement of the main person and the important person, and positional relations of the main person and the important person with other persons.

The present invention also provides a program for causing a computer to execute each procedure of the important person determination method as described above.

The present invention also provides a program for causing a computer to execute each procedure of the image layout method as described above.

The present invention also provides a computer readable recording medium having recorded thereon a program for causing a computer to execute each procedure of the above-described important person determination method or the above-described image layout method.

The present invention is capable of determining an important person irrespective of the number of appearances and of performing an image layout based on the important person as determined without relying on the number of appearances.

BRIEF DESCRIPTION OF THE DRAWINGS

FIG. 11 is a diagram showing patterns of trimming processing performed in an image trimmer of the image processor in FIG. 10.

DETAILED DESCRIPTION OF THE INVENTION

An image processor, an important person determination method, an image layout method based on an important person as well as a program and a recording medium according to the present invention will be described below in detail with reference to preferred embodiments shown in the accompanying drawings.

Embodiment 1

Figure 1:
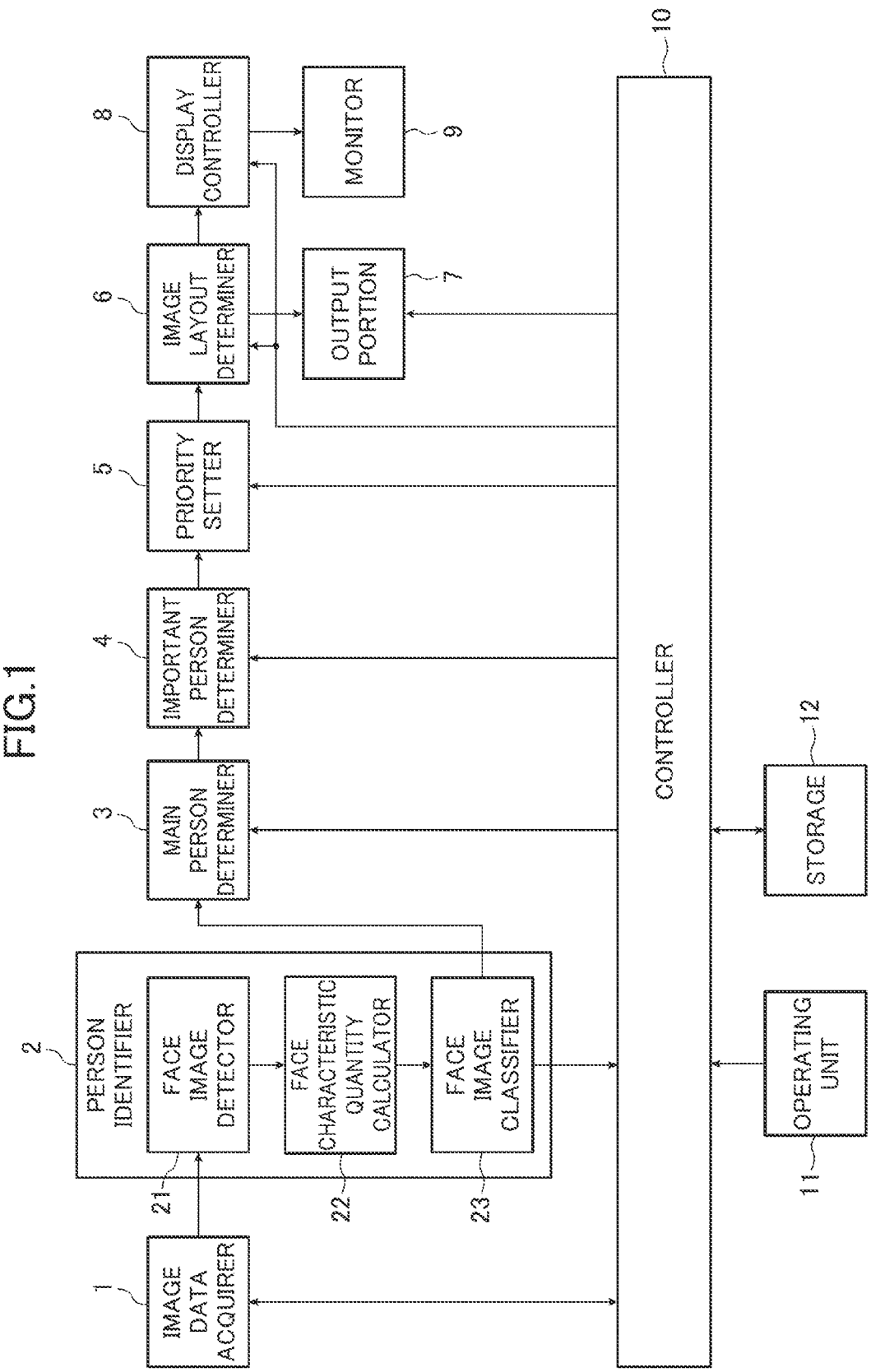
FIG. 1 is a block diagram showing the entire configuration of an image processor according to Embodiment 1 of the invention.

FIG. 1 is a block diagram showing the entire configuration of an image processor according to Embodiment 1 of the invention. The image processor of FIG. 1 includes an image data acquirer 1; a person identifier 2, a main person determiner 3, an important person determiner 4, a priority setter 5 and an image layout determiner 6 which are sequentially connected from the image data acquirer 1; an output portion 7 and a display controller 8 connected to the image layout determiner 6; and a monitor 9 connected to the display controller 8. The image processor also includes a controller 10 connected to each of the above-described image data acquirer 1, person identifier 2, main person determiner 3, important person determiner 4, priority setter 5, image layout determiner 6, output portion 7 and display controller 8; and an operating unit 11 and a storage 12 connected to the controller 10.

The image data acquirer 1 acquires large quantities of image data from devices and recording media outside the image processor. For example, the image data acquirer 1 is connected to a PC, an image server and the like to acquire image data stored therein or reads recording media used in a digital still camera (DSC), a cellular phone and the like to acquire image data stored in the recording media.

The person identifier 2 acquires a plurality of image data from the image data acquirer 1 and identifies, from face images, persons on images based on the respective image data. The person identifier 2 includes a face image detector 21, a face characteristic quantity calculator 22 and a face image classifier 23 which are sequentially connected.

The face image detector 21 subjects the respective image data to face image detection processing to detect face images each including a face portion of a person from images based on the respective image data, thereby generating face image data. Various known techniques can be used in the face image detection processing. In a case where one image includes face images of a plurality of persons, the face images of all the persons are detected to generate face image data corresponding to the respective face images. For easier comparison and management, each face image data is preferably encoded to have a predetermined aspect ratio, a predetermined pixel size and a predetermined file format. Furthermore, each face image data includes, as meta-information, information of original image data from which a face image was detected. Examples of the information of original image data include access information to the original image data, shooting date and time information of the original image data, shooting position information (GPS positional information) of the original image data, information on the detected face image position and information on the face image size. The information on the detected face image position includes, for example, coordinates of the central position of a face image in its original image used to generate face image data, and the information on the face image size is information on the size of a face image with respect to its original image and is, for example, information on the area within a rectangular trimming frame and the aspect ratio thereof in a case where a rectangular face image is cut out from the original image.

The face characteristic quantity calculator 22 calculates characteristic quantities of a face image based on face image data generated from the face image detected by the face image detector 21. For example, the face characteristic quantity calculator 22 extracts eyes (including their inner corners and outer corners), a nose, a mouth (including its corners) and a profile from the face image data, and calculates positions and sizes thereof, and relations between the positions or sizes as characteristic quantities of the face image (face characteristic quantities).

The face image classifier 23 performs same person determination processing based on the face characteristic quantities calculated by the face characteristic quantity calculator 22 to classify the face image data into respective person categories. In the same person determination processing, for example, a method which includes generating respective model data from a plurality of face characteristic quantities and performing the same person determination processing based on differences between the model data, and various known same person determination methods can be used. A plurality of persons on a plurality of images based on a plurality of image data can be respectively identified by performing a series of processing from the face image detection to the classification of face image data based on the same person determination processing.

The main person determiner 3 determines a main person from the respective persons identified by the person identifier 2. For example, the main person determiner 3 determines, as the main person, a person whose number of face images (generated face image data) as detected by the face image detector 21 of the person identifier 2 is largest. It should be noted that the foregoing main person determination method is merely an example and, the number of main persons is not necessarily limited to one but a plurality of persons may be determined as main persons.

The important person determiner 4 determines a person highly related to the main person as an important person from among the other persons than the main person as determined by the main person determiner 3. A detailed description will be given later of the determination of a person as an important person but the number of important persons may not necessarily be one. In a case where the important person determiner 4 determines a plurality of persons as important persons, the important persons may be ranked according to the degree of importance thereof.

The priority setter 5 sets the priorities of a plurality of image data for use in layout based on the main person as determined in the main person determiner 3 and the important person as determined in the important person determiner 4. The priority setting will be described later in detail.

The image layout determiner 6 lays out images based on the priorities of the image data as determined in the priority setter 5. For example in a template of an image product such as a photo book, areas where images are to be arranged (image arrangement areas) are previously numbered in serial order, and the image layout determiner 6 determines an image layout based on the priorities of the image data and the order of the image arrangement areas of the template.

The output portion 7 outputs data on the image layout (image layout data) of the image product including a plurality of image data to the outside. The output portion 7 is, for example, connected to a printing device such as a printer or a recording device to output image layout data to the printing device or the recording device. It should be noted that the printing device prints image layout data including a plurality of images on a paper medium or the like to produce an image product and the recording device records image layout data including image data arranged in image arrangement areas of a template.

The display controller 8 acquires the image layout data of the image layout determined in the image layout determiner 6 or acquires screen display data of a management screen from the controller 10 and displays the image layout or the management screen on the monitor 9. The monitor 9 acquires the image layout data from the display controller 8 to display the image layout on the display screen or acquires the screen display data of the management screen to display the management screen on the display screen in an operable manner. Various known display devices such as a liquid crystal display can be used as the monitor 9.

The controller 10 is directly or indirectly connected to each section of the image processor to control each section of the image processor based on a user's instruction through the operating unit 11 or a specified program or the like stored in an internal memory (not shown). For example, operations of the image processor through the above-described management screen, changes to the main person and important persons, and changes to the image layout which has been made are performed through the controller 10.

The operating unit 11 receives various instructions from a user and outputs these instructions to the controller 10 and, for example, various known configurations including a keyboard and a mouse can be used.

The storage 12 stores the above-described plurality of image data and plurality of face image data, information related to these image data, information on persons included in the plurality of image data (including information on the main person and important person) and the like. The storage 12 may be configured by, for example, recording media such as an HDD and an SSD, or an image server including recording media such as an HDD and an SSD.

Figure 2:
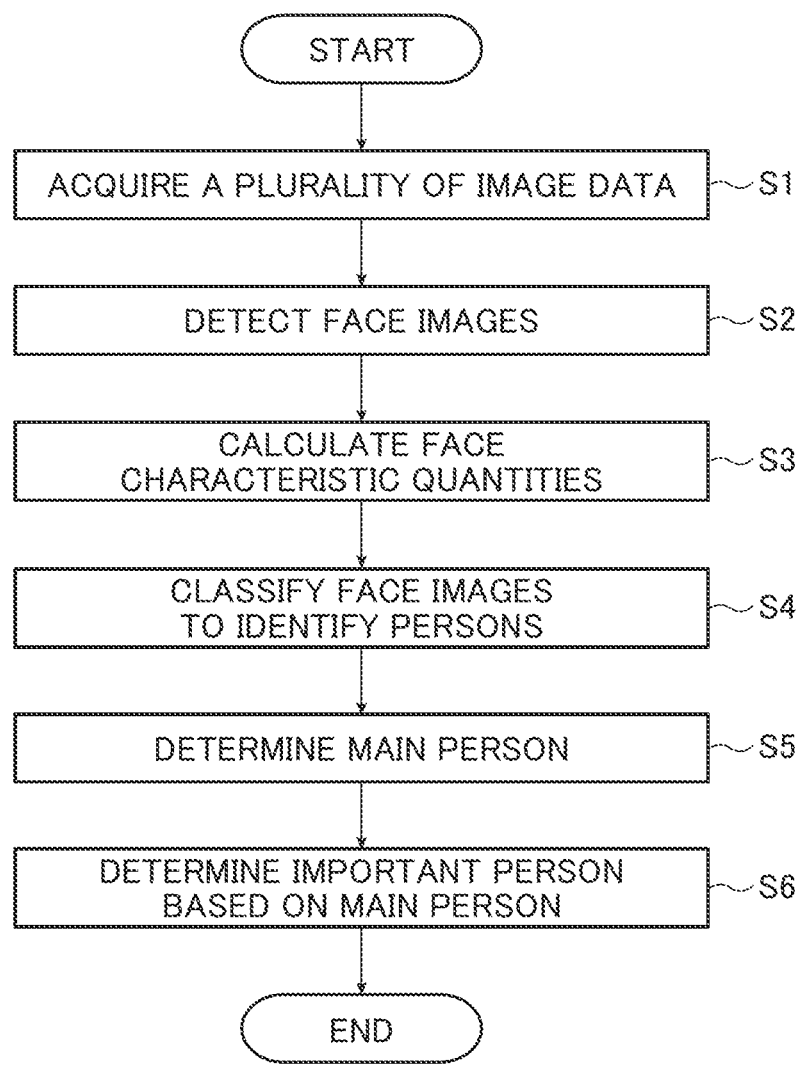
FIG. 2 is a flow chart illustrating an operation of important person determination processing (important person determination method) performed with the image processor of FIG. 1.

Next, the operation of important person determination processing (important person determination method) in the image processor of FIG. 1 will be described with reference to a flow chart shown in FIG. 2.

As Step S1, the image data acquirer 1 is connected to an external storage or the like to acquire a plurality of image data from the external storage or the like. The thus acquired plurality of image data are output to the person identifier 2.

Next, as Step 2, the face image detector 21 of the person identifier 2 detects face images from images based on the respective image data to generate face image data. As described above, each face image data is encoded into a predetermined aspect ratio, a predetermined pixel size and a predetermined file format, and includes, as meta-information, access information to its original image data, shooting date and time information of the original image data, shooting position information of the original image data, information on the detected face image position and information on the face image size. The generated face image data is output to the face characteristic quantity calculator 22.

Same Person Determination Processing

In the subsequent Step S3, the face characteristic quantity calculator 22 detects face parts such as eyes, a nose, a mouth and a profile from the face images based on the face image data and calculates face characteristic quantities based on the arrangement, the shapes and the sizes of the face parts and relations therebetween.

In Step 4, the face image classifier 23 generates respective model data based on the plurality of face characteristic quantities corresponding to the plurality of face image data as calculated in the face characteristic quantity calculator 22, compares the model data with each other to classify the respective face image data into face image groups each relating a person, and outputs information on persons corresponding to these image groups as information on appearing persons. An example of the model data includes a vector quantity based on a positional relation between face parts which is a face characteristic quantity.

Figure 3:
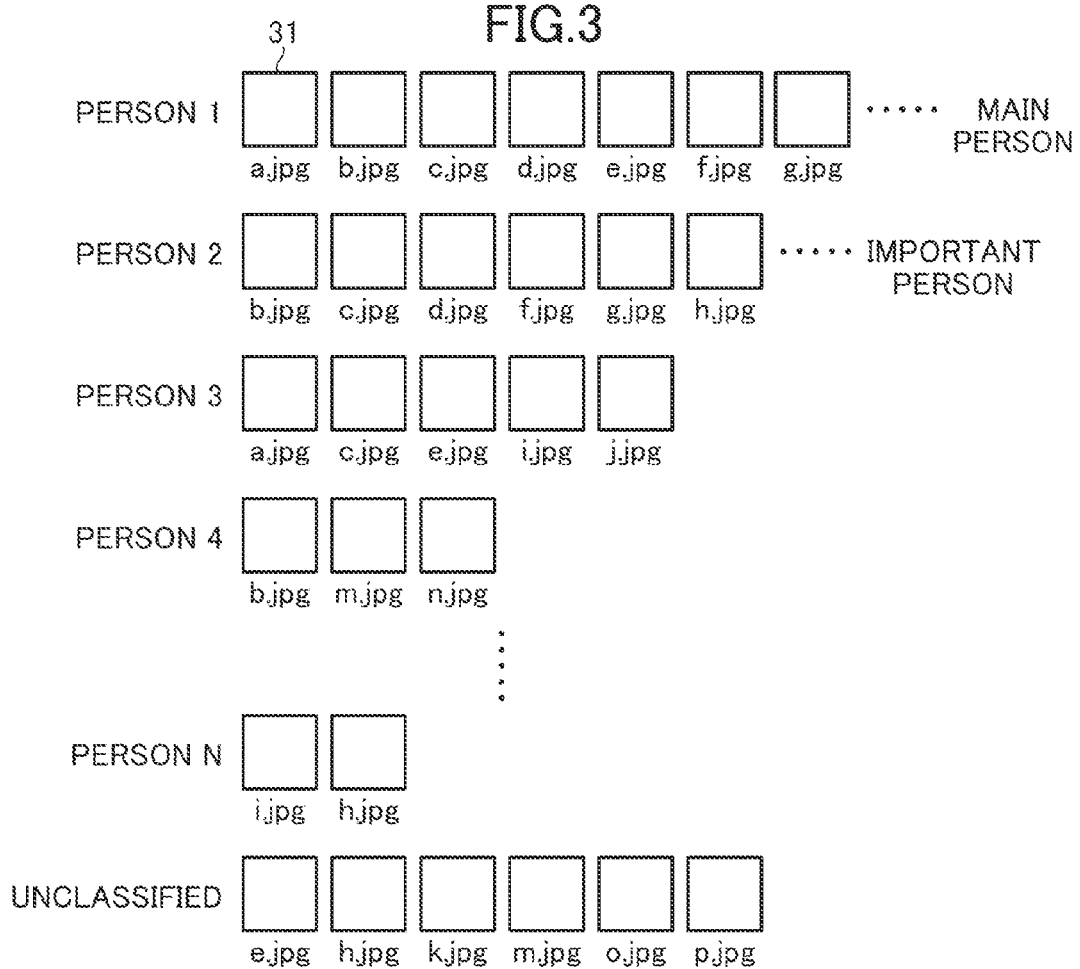
FIG. 3 is an explanatory diagram specifically illustrating the important person determination processing in FIG. 2.

FIG. 3 is an explanatory diagram illustrating an example of face image groups formed by classification in the face image classifier 23. A rectangular image 31 in FIG. 3 is a face image based on the above-described face image data or a thumbnail image of the face image (the rectangular image 31 will be hereinafter referred to as face image 31). The term "PERSON 1" located on the left side of the face image 31 is a name representing a face image group based on a plurality of face images aligned next to the term "PERSON 1" and including the face image 31, and indicates a person corresponding to the face image group. In short, the plurality of face images aligned next to the term "PERSON 1" are all face images of "PERSON 1."

The term "a.jpg" under the face image 31 is given to explain the file name of original image data from which the face image was detected. As described above, the face image data actually includes, as meta-information, information on the original image data including the file name of the original image data and the like. For descriptive purposes, each of the face images other than the face image 31 is also provided with the file name of its original image data under each of the face images as in the case of the face image 31.

FIG. 3 shows that persons whose number is N, including from "PERSON 1" to "PERSON N" are identified from a plurality of image data. In FIG. 3, a face image group named "UNCLASSIFIED" exists in addition to "PERSON 1" to "PERSON N." It should be noted that face images included in the face image group named "UNCLASSIFIED" are those which cannot be classified by the above-described same person determination processing.

Determination of Main Person

In Step S5, the main person determiner 3 determines a main person based on information on appearing persons as output from the person identifier 2. The information on appearing persons as used herein includes not only information on face image groups formed by classification in the face image classifier 23 (information on identified persons) but also the number of face images (face image data) included in each face image group and meta-information included in the face image data.

Although there are various methods to determine a main person, the main person determiner 3 determines as a main person, for example, a person whose number of face images in the face image group (a person whose number of face images as detected by the face image detector 21) is largest, in other words, a person appearing most frequently in a plurality of image data. "PERSON 1" to "PERSON N" in FIG. 3 are arranged in order of decreasing number of face images. Therefore, the main person determiner 3 determines PERSON 1 whose number of face images is largest as a main person.

The number of main persons may not necessarily be one but the main person determiner 3 may also determine a plurality of main persons, including, for example, a case of selecting two persons appearing most frequently as main persons. For example in a case where a main person or main persons are determined from a plurality of image data mainly composed of family photos including two brothers, the two brothers may be determined as main persons.

Determination of Important Person

In Step S6, the important person determiner 4 determines a person highly related to the main person as an important person based on the information on appearing persons as output from the above-described person identifier 2 and the main person as determined by the above-described main person determiner 3.

Although various methods are available to determine whether a person is an important person, the important person determiner 4 determines, for example, a person who is seen with the main person on a large quantity of image data as an important person. In the case as shown in FIG. 3 in which a main person is seen in image data of "a.jpg", "b.jpg", "c.jpg", "d.jpg", "e.jpg", "f.jpg" and "g.jpg" and "PERSON 2" is seen in image data of "b.jpg", "c.jpg", "d.jpg", "f.jpg", "g.jpg" and "h.jpg", "PERSON 2" is seen with the main person in 4 pieces of image data including "b.jpg", "c.jpg", "d.jpg" and "f.jpg" and is most often seen with the main person among "PERSON 2" to "PERSON N."

The important person determiner 4 thus calculates for all the persons except the main person ("PERSON 1"), that is, "PERSON 2" to "PERSON N," the number of image data on which each of them is seen with the main person and determines a person who is seen with the main person in the largest number of image data as an important person. In this case, the important person determiner 4 determines that "PERSON 2" who is seen with the main person in the largest number of image data is an important person.

As with the case of the above-described main person, the number of important persons is not limited to one but a plurality of persons may be determined to be important persons in order of decreasing number of image data in which each of them is seen with the main person. In a case where a plurality of persons are determined to be important persons, they may be prioritized as Important person 1, Important person 2 etc., in order of decreasing number of image data in which each of them is seen with the main person.

Image Layout

Figure 4:
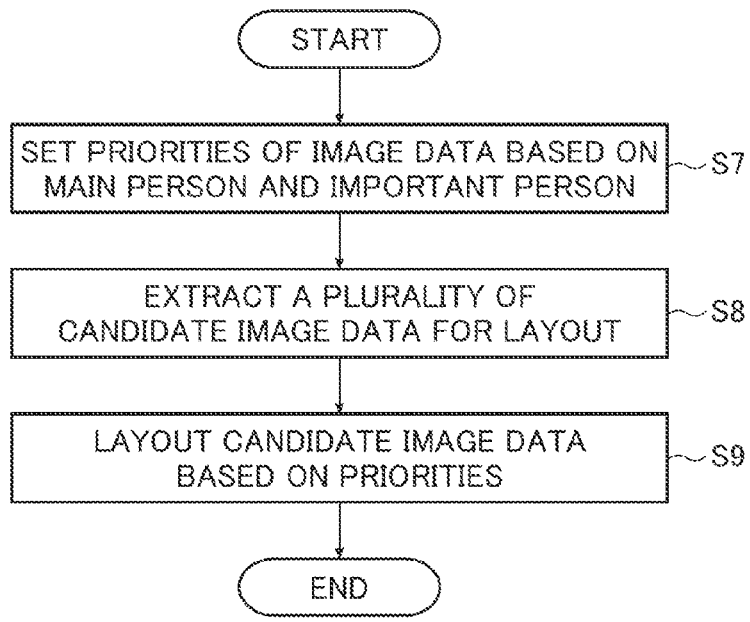
FIG. 4 is a flow chart illustrating an operation of image layout processing (image layout method) performed with the image processor of FIG. 1.

Next, the operation of image layout (image layout method) in the image processor of FIG. 1 will be described with reference to a flow chart shown in FIG. 4. The flow chart in FIG. 4 follows the flow chart shown in FIG. 2. In addition, a case where an image product to be created is a photo book and images are laid out on predetermined pages of the photo book will now be described as an example.

As Step S7, the priority setter 5 sets the priorities of the plurality of image data based on the important person as determined in the above-described important person determiner 4 and the main person as determined in the above-described main person determiner 3.

The priorities are set, for example, at five levels by comprehensively judging the presence or absence of the main person and the important person on images, the layout of the main person and the important person on the images, the sizes of the faces of the main person and the important person on the images, the number of persons appearing in the images (including the main person and the important person).

Figure 5A:
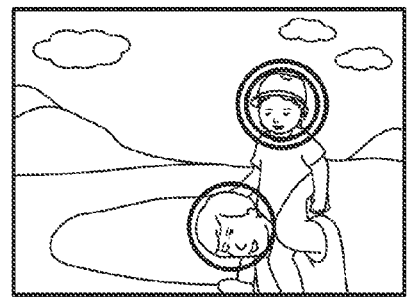
FIGS. 5A to 5D are each a specific example of an image for illustrating the relation between positioning of a main person and an important person and image priority.
Figure 5B:
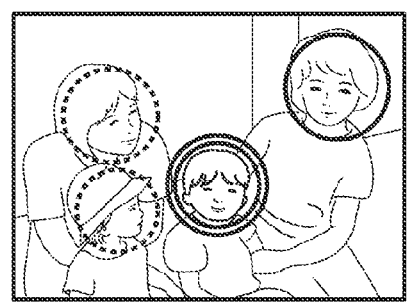
Figure 5C:
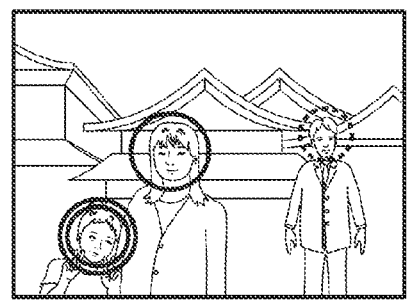
Figure 5D:
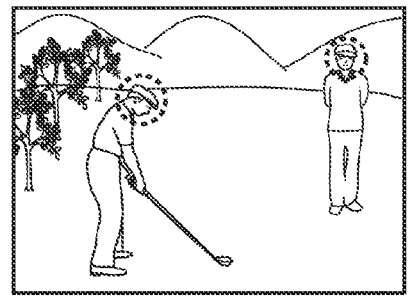

As shown in FIG. 5A, image data including a main person (person whose face image is surrounded by a double circle; hereinafter, such persons on images also indicate main persons) and an important person (person whose face image is surrounded by a circle; hereinafter, such persons on images also indicate important persons) in a larger size in the vicinity of the center of an image is set as, for example, "Priority 5" which is the highest priority. As shown in FIG. 5B, image data in which a main person and an important person are seen together and which also includes other persons than the main person and the important person (persons whose face images are surrounded by broken lines; hereinafter, such persons on images also indicate other persons) in the vicinity of the main person and the important person is set as, for example, "Priority 4" so as to have the second highest priority behind the image data in FIG. 5A. As shown in FIG. 5C, image data in which a main person and an important person are seen together and which includes one other person on the background is set as, for example, "Priority 3" so as to have the third highest priority behind the image data in FIG. 5B. Image data in which a main person or an important person is only seen is set as, for example, "Priority 2" so as to have lower priority than the image data in FIG. 5C. As shown in FIG. 5D, image data in which neither a main person nor an important person is seen is set as, for example, "Priority 1" so as to have the lowest priority.

In the subsequent Step S8, the controller 10 extracts a plurality of candidate image data for layout on the predetermined pages of the photo book from among the plurality of image data according to an instruction from a user. When the user operates the operating unit 11 to specify the shooting period of image data, the category of the image data (e.g., category based on event titles such as athletic meeting and New Year's holiday entered by the user or category based on image contents as obtained by using a technique for automatically determining the image contents), the number of pages of the photo book for which a layout is to be performed, the template of each page for which the layout is to be performed, and so forth, the controller 10 calculates the number of image data necessary to create the photo book and extracts a sufficient number of candidate image data to create the photo book from among the plurality of image data. In creating a photo book, better image data having a higher priority is selected from a lot of candidate image data and adopted to the photo book, and hence the number of candidate image data is preferably at least twice as large as the number of image data necessary to create the photo book, for example.

Figure 6:
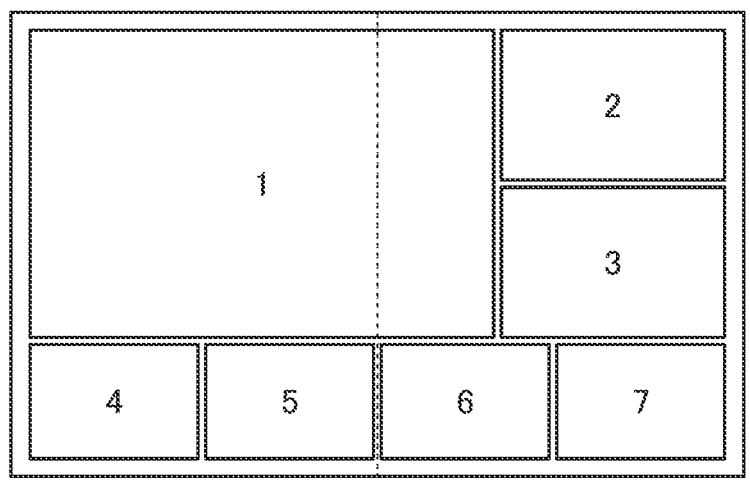
FIG. 6 is a schematic diagram showing an exemplary template of double pages in a photo book.

FIG. 6 is a schematic diagram showing an exemplary template of double pages in a photo book. The template has image arrangement areas set according to the priorities. In FIG. 6, in principle, arrangement numbers of 1 to 7 are set in order, starting from an image arrangement area in which an image is to be displayed in a larger size.

Finally, as Step S9, the image layout determiner 6 selects candidate image data to be laid out from among the above-described plurality of candidate image data based on the priorities set in the priority setter 5 and determines the layout of the candidate image data based on the priorities.

For example, the image layout determiner 6 arranges the plurality of candidate image data in order of decreasing priority and determines the image layout so that the foregoing candidate images are laid out in order of image arrangements 1 to 7 as shown in FIG. 6. The thus determined image layout is displayed on the monitor 9 through the display controller 8 and is also output to the outside from the output portion 7 as data on the image layout (image layout data) together with its corresponding image data based on a user's instruction.

Figure 7:
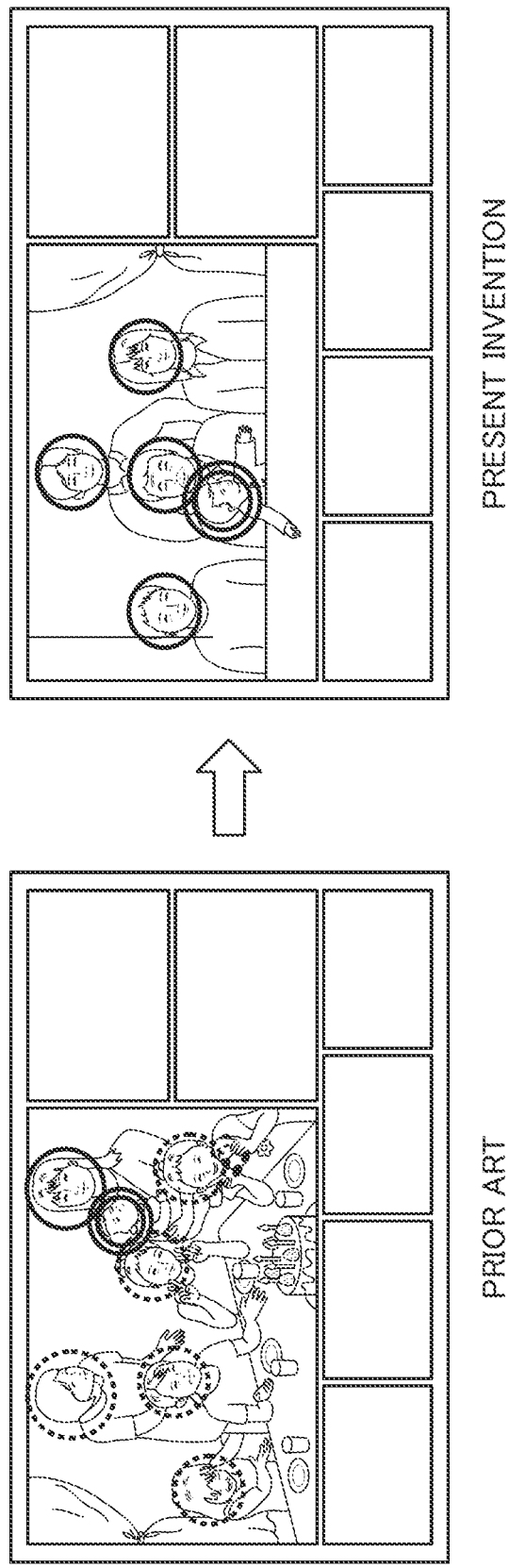
FIG. 7 is a comparison diagram between an image layout of the invention and a conventional image layout.

FIG. 7 is a comparison diagram between an image layout of the invention and a conventional image layout. As shown in FIG. 7, according to the conventional image layout, for example, an image including a main person and an important person may be able to be displayed in a larger size based on the number of face images or the presence or absence of the main person but the level of user satisfaction with this image layout is not high because the image also includes other persons than the main person and the important person, and the main person and the important person are not centered in the image. In contrast, the image layout according to the invention is capable of displaying, for example, an image including only a main person and an important person in a larger size. So, the level of user satisfaction with this image layout is high and a photo book with which the user satisfaction level is as a whole high can be proposed.

Image Data Management Screen

Figure 8:
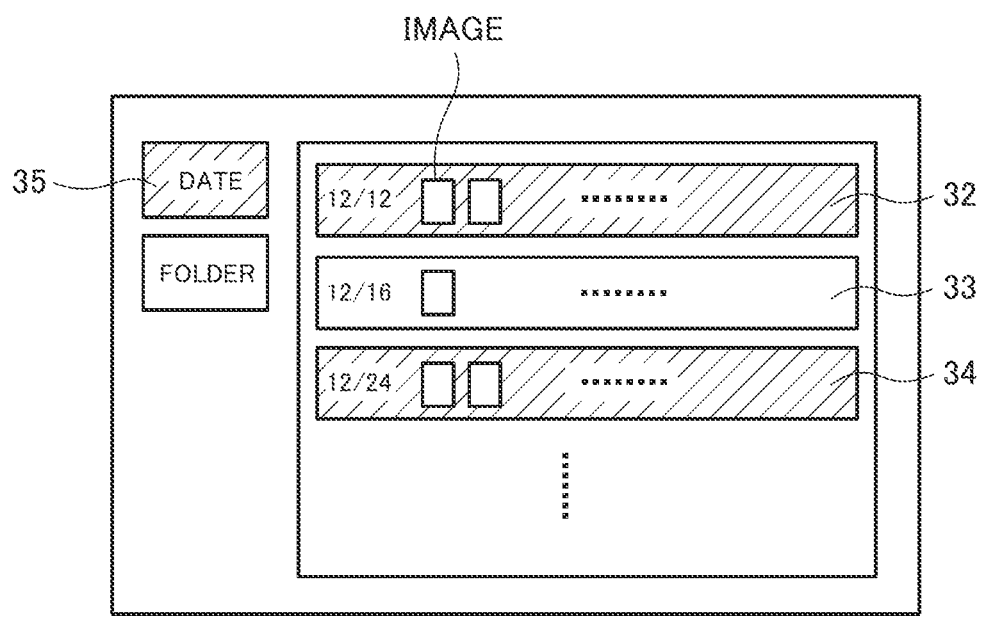
FIG. 8 is a diagram showing an example of an image data management screen of the image processor in FIG. 1.

FIG. 8 is a schematic diagram showing an example of an image data management screen of the image processor in FIG. 1. In the image processor of FIG. 1, a plurality of image data are classified into image groups (management image groups) based on predetermined criteria and displayed on the management screen by predetermined management images (e.g., block images) showing the image groups, respectively. For example, as shown in FIG. 8, a plurality of image data are classified into a plurality of image groups based on the shooting date and time, and displayed by blocks (management images) 32 to 34 and the like. Examples of the foregoing predetermined criteria include shooting date and time of image data, shooting position of the image data and category of the image data. Rectangular images following the shooting date and time in the blocks 32 to 34 show exemplary (thumbnail images of) images in the image groups corresponding to the respective blocks.

The controller 10 configures the image data manager according to the invention and, for example, in a case where image data including a main person and an important person exists in image data classified into a predetermined image group, the controller 10 may highlight a block corresponding to this image group by controlling the display controller 8. Referring to FIG. 8, since an image group of which the shooting date and time is December 12 (date) and an image group of which the shooting date and time is December 24 (date) have image data including a main person and an important person, the block 32 corresponding to the image group dated December 12 (date) and the block 34 corresponding to the image group dated December 24 (date) are highlighted among the blocks 32 to 34. In FIG. 8, the date is selected as a criterion for classifying a plurality of image data into image groups and hence the date block 35 is also highlighted. Various known highlighting methods including color change, blinking, frame thickening and indicating in boldface can be used. The date is not limited to the foregoing example on a daily basis but classification can be made on an hourly basis, a weekly basis, a monthly basis, a yearly basis or the like.

Main Person- and Important Person-Managing Screen

Figure 9:
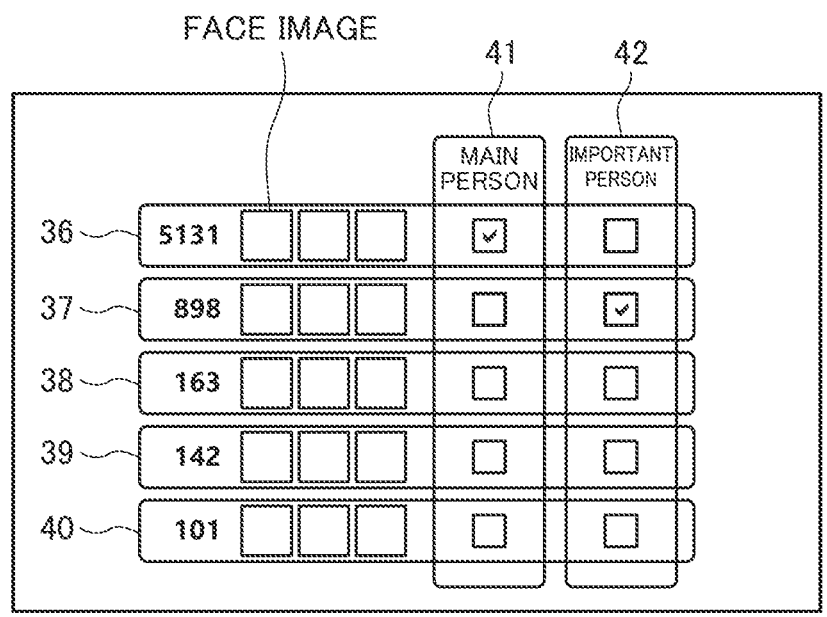
FIG. 9 is a diagram showing an example of a main person- and important person-changing screen of the image processor in FIG. 1.

FIG. 9 is a schematic diagram showing an example of a main person- and important person-managing screen of the image processor in FIG. 1. In the main person- and important person-managing screen of FIG. 9, appearing persons as identified by the same person determination processing are represented by frames (frames 36 to 40) which extend horizontally on the screen, respectively; whether or not each appearing person is a main person is represented by checkboxes in a frame 41 which extends vertically on the screen; and whether or not each appearing person is an important person is represented by checkboxes in a frame 42 which also extends vertically on the image. It can be seen that a main person checkbox at an intersection of the frames 36 and 41 is checked and hence a person corresponding to the frame 36 is a main person, whereas an important person checkbox at an intersection of the frames 37 and 42 is checked and hence a person corresponding to the frame 37 is an important person. It should be noted that the number within each of the frames 36 to 40 represents a number of image data in which a person corresponding to each frame is seen and rectangular images following the numbers within the frames 36 to 40 represent exemplary (thumbnail images of) face images of persons corresponding to the frames.

Changes to Main Person and Important Person

A user can operate the operating unit 11 to change the main person- and important person-managing screen through the controller 10 (person changer according to the invention), thereby changing a main person or an important person.

To be more specific, the user operates the controller 10 through the operating unit 11 to change any of the checkboxes within the frame 41, that is, to check or uncheck any of the checkboxes to thereby change the main person, or to change any of the checkboxes within the frame 42 to thereby change the important person.

When the user changed the main person to another, the controller 10 controls the important person determiner 4 to redetermine an important person based on a main person after the change. In addition, the controller 10 controls the priority setter 5 to reset the priorities of the plurality of image data based on the main person after the change and the redetermined important person. Likewise, the controller 10 controls the image layout determiner 6 to redetermine the image layout based on the reset priorities.

When the user changed the important person to another, the controller 10 controls the priority setter 5 to set the priorities of the plurality of image data based on an important person after the change. Likewise, the controller 10 controls the image layout determiner 6 to redetermine the image layout based on the reset priorities.

As described above, according to the present invention, a person can be determined to be an important person irrespective of the number of appearances by the important person determination based on the relation to the main person. As described above, an image layout with which the user satisfaction level is high can also be performed by determining the image layout based on the important person irrespective of the number of appearances.

Embodiment 2

In the case of laying out image data on an image product such as a photo book, the image processor according to the invention may perform automatic trimming in order to create a photo book with which the user satisfaction level is higher.

Figure 10:
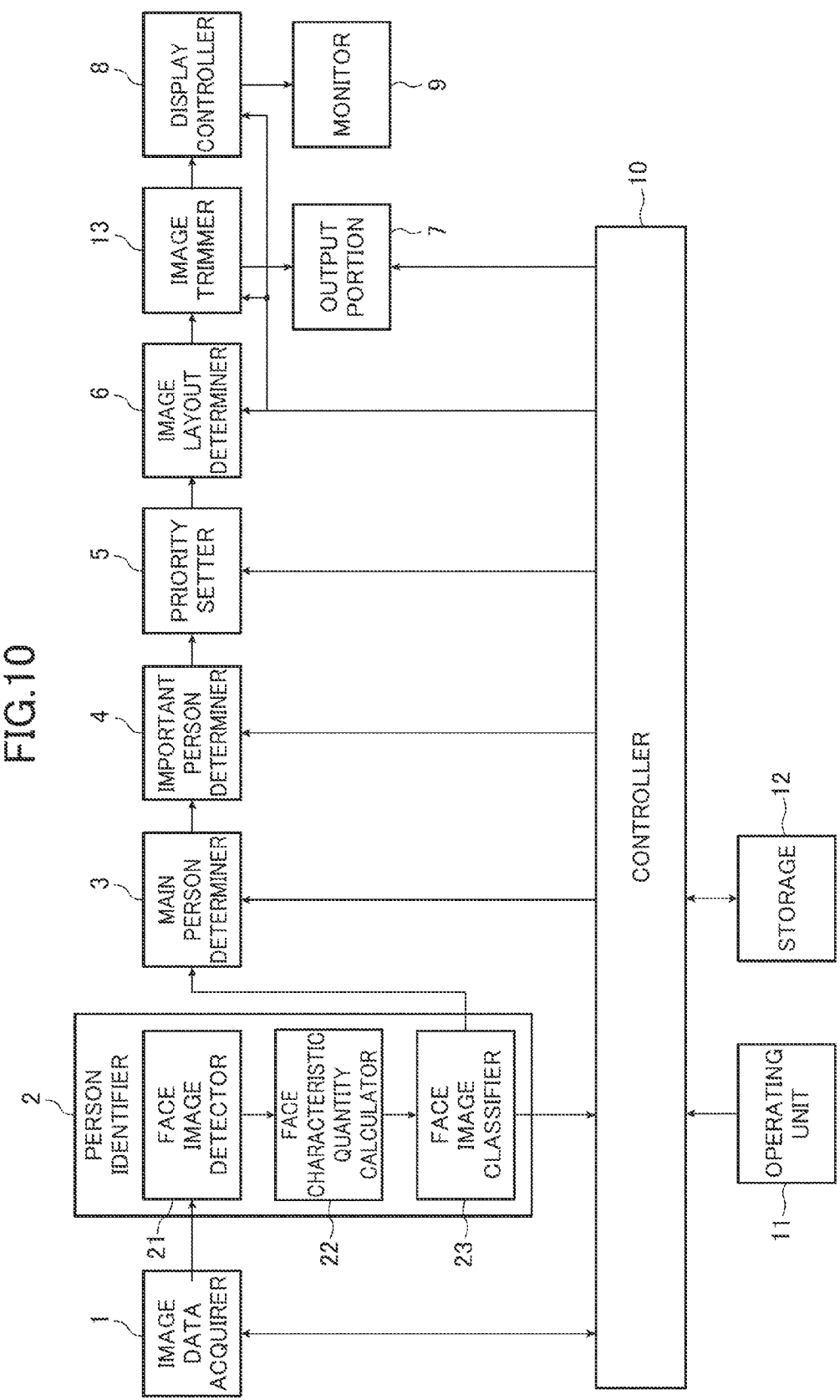
FIG. 10 is a block diagram showing the entire configuration of an image processor according to Embodiment 2 of the invention.

FIG. 10 is a block diagram showing the entire configuration of an image processor according to Embodiment 2 of the invention.

An image processor in FIG. 10 is different from the image processor in FIG. 1 in that the image processor in FIG. 10 includes an image trimmer 13 between the image layout determiner 6 on the one hand, and the output portion 7 and the display controller 8 on the other. Therefore, since the configurations of the image data acquirer 1, the person identifier 2, the main person determiner 3, the important person determiner 4, the priority setter 5, the image layout determiner 6, the output portion 7, the display controller 8, the monitor 9, the controller 10, the operating unit 11 and the storage 12 except the image trimmer 13 are the same as those in the image processor in Embodiment 1, their description will be omitted.

The operation of the image processor will be also described mainly based on the operation of the image trimmer 13 and a description of the operation of the sections other than the image trimmer 13 will be omitted.

The image layout determiner 6 and the controller 10 are connected to the image trimmer 13, which in turn is connected to the output portion 7 and the display controller 8.

When a predetermined image (hereinafter referred to as "image to be arranged") is to be arranged in an image arrangement area as determined by the image layout determiner, the image trimmer 13 subjects the image to be arranged to predetermined trimming processing so that the image to be arranged may be shaped to conform with the shape of the image arrangement area.

FIG. 11 is a diagram showing patterns of trimming processing performed in the image trimmer 13. The image trimmer 13 trims an image to be arranged according to a predetermined pattern based on image contents of the image to be arranged.

As shown in FIG. 11, in a case where an image to be arranged includes a main person and an important person but there is no other person near the main person and the important person, the image to be arranged is trimmed as Pattern 1 so that the main person and the important person are arranged in the center. In a case where an image to be arranged includes a main person and an important person and there is one other person near the main person and the important person, the image to be arranged is trimmed as Pattern 2 so as to also include the one other person in addition to the main person and the important person. In a case where an image to be arranged does not include a main person or an important person, the image to be arranged is trimmed as Pattern 3 so as to include all persons. The trimming processing patterns shown in FIG. 11 are merely examples and the trimming processing pattern is not necessarily limited thereto. For example, an image to be arranged in which a main person or an important person is only seen in a large size may be trimmed so that the main person or the important person may be displayed in a larger size.

By trimming an image to be arranged according to the contents of the image to be arranged as described above, the image trimmer 13 can make the image to be arranged more attractive and provide a more attractive image layout.

Whether or not a main person and an important person are included in an image to be arranged can be reflected not only on the above-described trimming processing but also on the image layout as determined by the image layout determiner 6.

Figure 12:
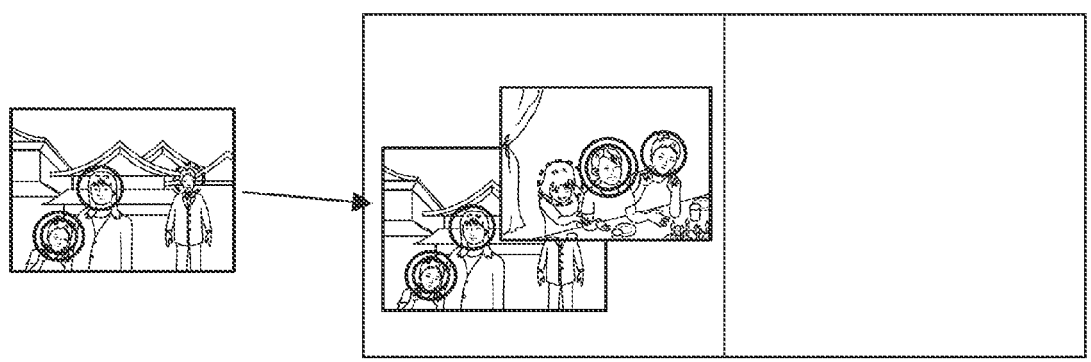
FIG. 12 is a diagram showing an example of an image layout in the image processors of FIGS. 1 and 10.
Figure 13:
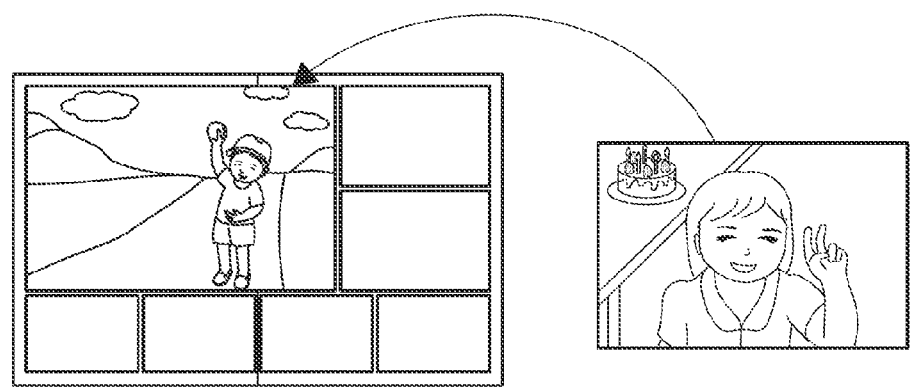
FIG. 13 is a diagram illustrating a problem of an image layout automatically made by prior art.

For example in a case as shown in FIG. 12 in which a main person and an important person are located on the lower left side of an image to be arranged and one other person is located on the upper right side of the image to be arranged, a different image to be arranged may be superimposed on the image to be arranged so that the main person and the important person are not hidden because the position of the face image of the main person, the position of the face image of the important person and the position of the face image of the one other person on the image to be arranged are known. The one other person is hidden by superimposing the different image to be arranged but the main person and the important person are not hidden by this different image to be arranged. So, an image layout with which the user satisfaction level is high can be performed.

Other Embodiments of Important Person Determination Processing

In addition, the important person determination processing is not limited to the above-described example. For example, instead of the number of image data including both a main person and a specific person, the distance between the face image of the specific person and the face image of the main person (distance between the face images) in an image including both the main person and the specific person may be calculated to determine whether the specific person is an important person, based on the average value of the distance between the face images, for example. Since the above-described distance between the face images varies with the size of the face images with respect to the original image, the distance between the face images is calculated based on a case where the face image of a main person is adjusted to a predetermined size. The distance between the face images can be used in common between various image data different in face image size by calculating the distance between the face images after adjusting the face image of the main person to a predetermined size as described above. The above-described example adopts the average value of the distance between the face images but the average value is a non-limitative example. For example, the minimum value or the mode value of the distance between the face images may be used as a criterion.

Whether a person is an important person may be determined not based on only the distance between the face images but based on both the number of images including a main person in addition to the person and the distance between the face images thereof. In addition, the important person determination method is not limited to these methods but whether a person is an important person may be determined by combining information on differences of the shooting date and time and differences of the shooting position (e.g., GPS information) between images including a main person and images including one or more persons other than the main person with the number of images including both the main person and the person and the distance between the face images as described above. An image having a smaller difference in shooting date and time or shooting position can be judged to be an image taken in the same event as a main person participated in and be therefore determined to include a person who is highly related to the main person.

The same person determination processing is not limited to the above-described methods but, for example, various known methods including a method using a Gobar filter can be used.

Image data or face image data includes meta-information as described above. However, the meta-information does not need to be stored with the image data or the face image data but may be associated with the image data or the face image data and stored separately from the image data or the face image data so as to be accessible from the image data or the face image data.

In the above-described embodiments, a plurality of candidate image data for layout on an image product are extracted from a plurality of image data but in a case where the volume of the plurality of image data is small, the whole of the plurality of image data may be used as the plurality of candidate image data instead of performing candidate image data extraction processing.

The above-described important person determination method and image layout method according to the invention may be processed in a computer by executing an important person determination program and an image layout program, respectively. For example, the important person determination program according to the invention includes a procedure for causing the CPU of a computer to execute the respective steps of the above-described important person determination method, and the image layout program according to the invention includes a procedure for causing the CPU of a computer to execute the respective steps of the above-described image layout method. The programs including such procedures may each be configured as one or more program modules.

The important person determination program and the image layout program including the procedures executed by the computer may be stored in, for example, an internal memory (not shown) of the computer or be stored in a recording medium. In execution, the CPU or the like reads out the programs from the internal memory (not shown) or the recording medium and executes the read-out programs.

Accordingly, the present invention may be a computer readable memory or recording medium storing the above-described important person determination program or the above-described image layout program.

While the image processor, the important person determination method, the image layout method based on an important person as well as the program and the recording medium according to the present invention have been described in detail above, the present invention is not limited to the above embodiments, and various improvements and modifications may be made without departing from the spirit and scope of the invention.

What is claimed is:

1. An image processor comprising:
an image data acquirer configured to acquire a plurality of image data;
a face image detector configured to detect face images from the plurality of image data acquired by the image data acquirer;
a person identifier configured to perform same person determination processing based on the face images detected in the face image detector to classify the face images into image groups each including face images of a single person, thereby identifying persons corresponding to the respective image groups;
a main person determiner configured to determine at least one person as a main person from among the persons identified by the person identifier;
an important person determiner configured to determine at least one person highly related to the main person as an important person based on the main person determined in the main person determiner, from among persons except the main person as identified by the person identifier;
a storage configured to store the plurality of image data;
an image data manager configured to classify the plurality of image data stored in the storage to manage the plurality of image data as predetermined management image groups; and
a monitor configured to display management images representing the predetermined management image groups, respectively,
wherein the image data manager highlights the management images displayed on the monitor when image data including at least one of the main person and the important person exists in the predetermined management image groups.

2. The image processor according to claim 1, wherein the main person determiner determines, as the main person, a person whose number of detected face images is largest.

3. The image processor according to claim 1, wherein the important person determiner determines a person who is seen with the main person on a largest number of image data as the important person, from among persons except the main person as identified by the person identifier.

4. The image processor according to claim 1,
wherein the face image detector detects the face images and positional information of the face images from the plurality of image data, and
wherein the important person determiner calculates a distance between two face images based on positional information of the main person and positional information of a person other than the main person on a single image as detected in the face image detector and determines whether the person is the important person based on the distance between the two face images.

5. The image processor according to claim 1,
wherein each of the plurality of image data includes, as meta-information, at least one of shooting date and time information and shooting position information, and
wherein the important person determiner determines whether a person other than the main person is the important person based on at least one of a difference between shooting date and time information of image data including the main person and shooting date and time information of image data including the person other than the main person and a difference between shooting position information of the image data including the main person and shooting position information of the image data including the person other than the main person.

6. The image processor according to claim 1, further comprising:
a priority setter configured to set priorities of the plurality of image data based on the main person determined in the main person determiner and the important person determined in the important person determiner;
an image layout determiner configured to determine a layout of the plurality of image data based on the priorities set in the priority setter; and
an output portion configured to output the plurality of image data in the layout determined by the image layout determiner.

7. The image processor according to claim 6, wherein the priority setter sets the priorities based on at least one of presence or absence of the main person and the important person, arrangement of the main person and the important person, and positional relations of the main person and the important person with other persons.

8. The image processor according to claim 6, further comprising:
a person changer configured to change the main person or the important person based on a user's instruction,
wherein the priority setter changes the priorities based on a main person or an important person after change in the person changer, and
wherein the image layout determiner changes the layout of the plurality of image data based on priorities after change.

9. The image processor according to claim 6, further comprising:
an image trimmer configured to subject images based on the plurality of image data to trimming processing according to the layout, and
wherein the image trimmer performs the trimming processing based on at least one of presence or absence of the main person and the important person, arrangement of the main person and the important person, and positional relations of the main person and the important person with other persons.

10. An important person determination method comprising:
detecting face images from a plurality of image data;
performing same person determination processing based on the detected face images to classify the face images into image groups each including face images of a single person, thereby identifying persons corresponding to the respective image groups;
determining at least one person as a main person from among the identified persons;
determining at least one person highly related to the main person as an important person based on the determined main person, from among persons except the main person;
classifying the plurality of image data to manage the plurality of image data as a plurality of management image groups;
displaying management images representing the plurality of management image groups on a monitor, respectively; and
highlighting the management images displayed on the monitor when image data including at least one of the main person and the important person exists in the plurality of management groups.

11. The important person determination method according to claim 10, wherein a person whose number of detected face images is largest is determined as the main person.

12. The important person determination method according to claim 10, wherein a person who is seen with the main person on a largest number of image data is determined as the important person, from among persons except the main person.

13. The important person determination method according to claim 10,
wherein the face images and positional information of the face images are detected from the plurality of image data, and
wherein a distance between two face images is calculated based on positional information of the main person and positional information of a person other than the main person on a single image and whether the person is the important person is determined based on the distance between the two face images.

14. The important person determination method according to claim 10,
wherein each of the plurality of image data includes, as meta-information, at least one of shooting date and time information and shooting position information, and
wherein whether a person other than the main person is the important person is determined based on at least one of a difference between shooting date and time information of image data including the main person and shooting date and time information of image data including the person other than the main person and a difference between shooting position information of the image data including the main person and shooting position information of the image data including the person other than the main person.

15. An image layout method comprising:
determining priorities of the plurality of image data based on the main person and the important person determined based on the important person determination method according to claim 10, and
determining a layout of the plurality of image data based on the priorities.

16. The image layout method according to claim 15, wherein the priorities are determined based on at least one of presence or absence of the main person and the important person, arrangement of the main person and the important person, and positional relations of the main person and the important person with other persons.

17. The image layout method according to claim 15,
wherein, when the main person or the important person was changed based on a user's instruction, the priorities are changed based on a main person or important person after change, and
wherein the layout of the plurality of image data is changed based on priorities after change.

18. The image layout method according to claim 15, wherein images based on the plurality of image data are subjected to trimming processing based on the layout and at least one of presence or absence of the main person and the important person, arrangement of the main person and the important person, and positional relations of the main person and the important person with other persons.

19. A non-transitory computer readable recording medium having recorded thereon a program for causing a computer to execute each procedure of the important person determination method according to claim 10.

20. A non-transitory computer readable recording medium having recorded thereon a program for causing a computer to execute each procedure of the image layout method according to claim 15.

* * * * *